United States Patent
Uppal et al.

(10) Patent No.: US 10,778,757 B1
(45) Date of Patent: Sep. 15, 2020

(54) LOAD BALANCING TRAFFIC VIA DYNAMIC DNS RECORD TTLS

(71) Applicant: Amazon Technologies, Inc., Seattle, WA (US)

(72) Inventors: Hardeep Singh Uppal, Seattle, WA (US); Matthew Graham Baldwin, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 16/011,277

(22) Filed: Jun. 18, 2018

(51) Int. Cl.
  *G06F 15/16* (2006.01)
  *H04L 29/08* (2006.01)
  *H04L 29/12* (2006.01)

(52) U.S. Cl.
  CPC ...... *H04L 67/1036* (2013.01); *H04L 61/1511* (2013.01); *H04L 67/101* (2013.01); *H04L 67/1008* (2013.01); *H04L 67/1017* (2013.01); *H04L 67/1029* (2013.01); *H04L 67/327* (2013.01)

(58) Field of Classification Search
  USPC .......... 709/245, 223, 225, 226, 222
  See application file for complete search history.

(56) References Cited

U.S. PATENT DOCUMENTS

| | | | |
|---|---|---|---|
| 6,078,943 | A | 6/2000 | Yu |
| 6,119,143 | A | 9/2000 | Dias et al. |
| 6,351,775 | B1 | 2/2002 | Yu |
| 6,813,635 | B1 | 11/2004 | Jorgenson |
| 7,441,045 | B2 | 10/2008 | Skene et al. |
| 7,552,237 | B2 | 6/2009 | Cernohous et al. |
| 8,549,148 | B2 | 10/2013 | Devarapalli et al. |
| 9,467,383 | B2 | 10/2016 | Lin et al. |
| 9,954,941 | B2 | 4/2018 | Kim et al. |
| 2001/0049741 | A1 | 12/2001 | Skene et al. |
| 2010/0223364 | A1 | 9/2010 | Wei |
| 2011/0307541 | A1 | 12/2011 | Walsh et al. |

*Primary Examiner* — Lan Dai T Truong
(74) *Attorney, Agent, or Firm* — Robert C. Kowert; Kowert, Hood, Munyon, Rankin & Goetzel, P.C.

(57) ABSTRACT

Various methods and apparatus for load balancing traffic via dynamic DNS record time-to-live values ("TTLs") are described. In at least some embodiments, a DNS layer of a DNS load-balanced system receives performance metrics corresponding to a plurality of server instances. If the DNS layer detects a performance metric imbalance for a server instance, it adjusts the TTL value for the DNS records associated with that instance. For example, the DNS layer can lower the TTL value in the DNS records associated with the server instance. This means that clients that have DNS record associated with this server instance will make more frequent DNS queries, thus resulting in at least some of those clients receiving IP addresses for other server instances. In some embodiments, the DNS layer can implement a load balancing scheme that determines which network address(es) to include in a DNS response based on the received performance metrics.

20 Claims, 9 Drawing Sheets

LOAD BALANCING TRAFFIC VIA DYNAMIC DNS RECORD TTLS

BACKGROUND

As the scale and scope of network-based applications and network-based services such as cloud computing services have increased, data centers may house hundreds or even thousands of host devices (e.g., web servers) that need to be load balanced. Conventional load balancers may include multiple network interface controllers (NICs), for example eight NICs, with some of the NICs handling inbound traffic from/outbound traffic to clients and the other NICs handling outbound traffic from/inbound traffic to the host devices (e.g., servers such as web servers) that are being load balanced. Load balancers typically also include logic that implements load balancing techniques such as round robin and/or least connections techniques to select which host device will handle a connection from a client.

In conventional load balancers, clients communicate with selected host devices on connection(s) that pass through the load balancer, and thus the data exchanged between a client and a selected host device in a conventional load balanced system flows through the load balancer. Some conventional load balancers may serve as proxies to the host devices that they front, and thus may terminate connections (e.g., Transmission Control Protocol (TCP) connections) from the clients and send the client traffic to the host devices on connections (e.g., TCP connections) established between the host devices and the load balancer. In other conventional load balancers, the load balancer does not terminate connections from the client and the host device. Instead, connections (e.g., Transmission Control Protocol (TCP) connections) are established between clients and host devices that pass through the load balancer. The load balancer modifies header information (e.g., TCP and IP header information) in packets that pass through the load balancer on the connections to transparently route traffic between the clients and host devices. These load balancers may be viewed as serving as routing/network address translation (NAT) firewalls between the clients and the load balanced host devices.

DNS-Based Load Balancers

DNS load balancing is the practice of configuring a domain in the Domain Name System (DNS) such that client requests to the domain are distributed across a group of server machines. A domain can correspond to a website, a mail system, a print server, or another service that is made accessible via the Internet. Taking advantage of the DNS layer for load balancing offers the consumer the ability to load balance anything that is issued a DNS name, which can be virtually any core system. This allows for load balancing based on the DNS records returned for the name query. A DNS system will allocate subsequent DNS requests to different servers set up to handle the overall load. DNS load balancing occurs at a higher level than the conventional load balancers. A DNS load balancer directs clients to direct their traffic to several different IP addresses, whereas a conventional load balancer takes a single IP address and splits the traffic going to it to multiple machines. The cost of a DNS load balancer is usually significantly less, and clients usually only pay for the usage of the system, versus a amortized large upfront cost of a conventional load balancer on which clients can be tied to the functional life and usefulness of a specific piece of hardware. In addition, DNS load balancing offers a number of advantages for load balancing within multiple geographic regions. DNS load balancing allows clients to manage the traffic to geographic regions and handle systemic incidents that occur outside of a specific datacenter through a global failover scenario.

Figure 1:
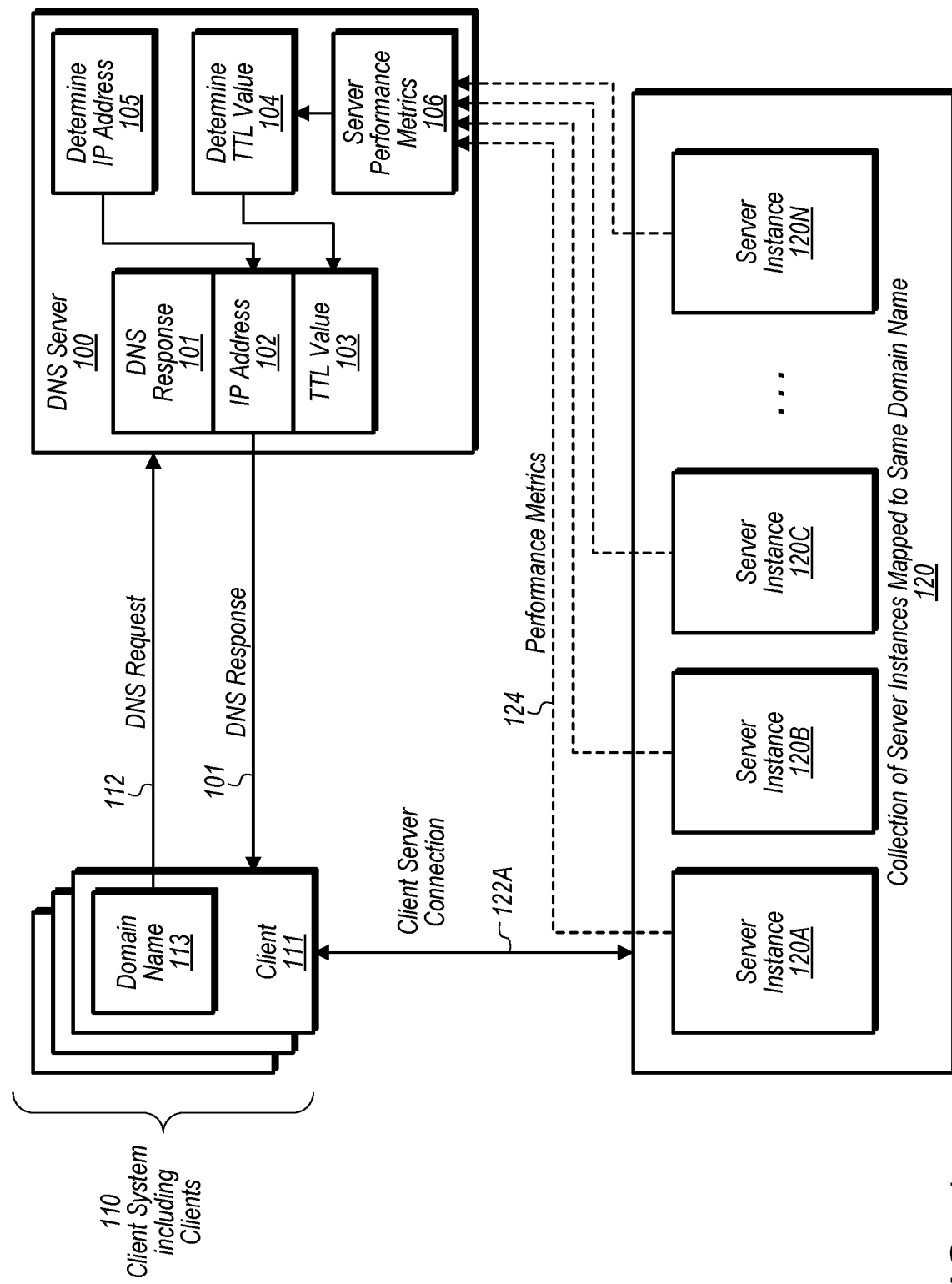
FIG. 1 illustrates an embodiment of a DNS-based load balanced system in which dynamic DNS record TTLs are implemented.

In the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of methods and apparatus for load balancing traffic via dynamic domain name system ("DNS") record time-to-live values ("TTLs") are described. Embodiments of a DNS-based load balancing method and apparatus that provides dynamic DNS record TTLs are described that may be implemented on or by DNS servers in load balanced systems. This DNS-based load balancing technique, in some embodiments, leverages the DNS protocol, to assign a server instance to a specific client with specific time limits for at least some connections between clients and server instances.

For customers or clients of a provider network, for example, where using a physical load-balancer isn't a feasible solution, DNS based load-balancing is a viable solution. DNS based load-balancing can be achieved using very low TTLs on the DNS records such that a request for a service running on a server instance frequently requires a DNS resolution. On each DNS query the system hands back different set of IP addresses mapped to a different server instance. While the specification specifically refers to IP addresses as one embodiment of the invention, other embodiments can use other types of network addresses, with embodiments being applicable to any type of network addresses. While this DNS-based solution produces a more load balanced system, it increases the latency for clients in receiving the first byte of data, since clients are required to frequently incur the latency of resolving DNS.

If the DNS based load balancing instead uses larger TTLs on the DNS records, then server instances might become frequently overloaded, while other server instances might sit idle, as clients with larger workloads are assigned by their received DNS records to a single server instance for a longer period of time, thus overloading those server instances with requests, while other clients who are assigned to other server instances might only have minimal workloads. Server instances whose IP addresses are assigned or mapped by DNS records at clients with minimal workloads would be underutilized, while server instances whose IP addresses are assigned or mapped by DNS records at clients with larger workloads could be overloaded. In addition, conventional DNS-based load balancing does not check for server or network outages or errors, and so always returns the same set of IP addresses for a domain even if servers are down or inaccessible.

To solve these and other problems, at least some embodiments of the invention consist of a DNS based load balancing using dynamic TTL values per "A records" such that DNS lookups are dynamically increased for server instances that are receiving more traffic than other server instances. In at least some embodiments, the TTL is specific for each of the IP addresses that are returned by the DNS layer in response to a DNS request. An "A record" is the most basic type of DNS record and is used to point a domain or subdomain to an IP address. An "A record" can map a domain name to an IP address of a computer or server hosting the domain. Assigning a value to an "A record" can be as simple as providing the DNS management panel with an IP address to where a domain or subdomain should point and a TTL value. The "A" in "A record" is conventionally known to stand for "address."

In at least some embodiments of the invention, a DNS layer receives metrics corresponding to the load of one or more components or connections in the system. The load can include, but is not limited to, the overall CPU workload of a server instance. The DNS layer can receive these metrics directly from the server instances or the server hosts associated with the server instances. The DNS server might instead receive these instances from a metrics monitoring service associated with the client service or a provider network, where the metrics monitoring service collects or gathers metrics for server instances. In some embodiments, there is an agent resident on each server instance whose function is to calculate CPU, I/O, memory consumption, and other sets of statistics around networking. The agent can then upload this information every minute, or at other time intervals, into a metrics monitoring service. The DNS layer can then receive a collection of these metrics that correspond to a collection of server instances from the metrics monitoring service.

The DNS layer can either request the metrics or be sent the metrics, either on a periodical or random basis. The DNS layer may store the metrics in its memory for some or all of the server instances, or request or be sent the metrics whenever they are needed. There are many other ways that the DNS layer can get access to the metrics. The metrics might correspond to the load across each server instance, or a group of server instances, where the term load across a server instance should not be construed as limiting, but in these embodiments, can be the usage of any one or more resources associated with the server instance. The metrics might correspond to other measurable statistics of a server instance, server host, or group of server instances or hosts that would also correspond to the load. For instance, the metrics might correspond to the requests received by a server instance, or the request rate, the performance capacity of the server instance, a server instance's availability information or a server's proximity information to a client. There are many other types of metrics that the DNS layer might receive or have access to, and the examples listed here should not be construed as limiting.

The DNS server can correspond these metrics to the IP addresses of the server instances. In some embodiments, the TTL value for the "A records" is set by default to 60 seconds. In addition, each "A record" only contains a single IP address mapped to a single server instance. In some embodiments, if the DNS layer detects a request imbalance for a server instance, it lowers the TTL value for the "A records" associated with that instance to half of the default value (i.e. 30 seconds). While in this embodiment the imbalance is a request imbalance, imbalances are not limited to request imbalances, and can be imbalances of any measurable metric regarding any component or network in the system. This would mean that traffic going to this server instance will make more frequent DNS queries, thus resulting in clients receiving IP addresses for other server instances. This would mean that more traffic from the imbalanced server instance will get spread to other server instances. In some embodiments, after modifying the TTL value, the DNS layer waits for some period for the default TTL value to expire, and for new "A records" with the lower TTL value to be handed back to requesting clients. If the imbalance still persists after some period of time, in some embodiments, the DNS layer again lowers the TTL value for the "A records" associated with that instance to half of the previous value (i.e. 15 seconds). In some embodiments, the DNS layer continues on this path until the TTL value reaches 0 for "A records" mapped to an imbalanced server host.

In some embodiments, once there isn't any imbalance in the request across the fleet, the DNS layer slowly dials up the TTL values that aren't at the default 60 seconds. More specifically, if the DNS layer does not detect a request imbalance for a server instance, it gradually raises the TTL value for the "A records" associated with that instance. In some embodiments, the raising of the TTL value for the "A records" associated with an instance occurs in smaller increments than the lowering of the TTL value. A reason for this might be because once the TTL value is decreased, setting the TTL value back to its original value (or a value higher than the original value) might create an oscillating effect with the load of the server instance, where the load of a server instance can be the usage of any one or more resources associated with the server instance. Slowly increasing the TTL value allows for load of a server instance to settle into a more optimal steady state value rather than oscillating between being heavily loaded and lightly loaded. In other embodiments, however, the raising of the TTL value may not be not gradual, and the raising of the TTL value for the "A records" associated with an instance occurs in greater increments than the lowering of the TTL value.

When the TTL value for the "A records" is raised, this means that traffic going to this server instance will make less frequent DNS queries, thus resulting in clients keeping their mapping of IP addresses for the particular instance that was previously assigned by the DNS layer. This means that server instances will keep their traffic from the clients that are assigned to them, since there is not a current request imbalance. In some embodiments, after gradually raising the TTL value, the DNS layer waits for some period for the default TTL value to expire, and for new "A records" with the higher TTL value to be handed back to requesting clients. If the DNS layer still does not detect a request imbalance for the server instance after some period of time, in some embodiments, the DNS layer again raises the TTL value for the "A records" associated with that instance. In some embodiments, the DNS layer continues on this path until the TTL value reaches the default value of 60 seconds for the "A records" mapped to a server instance.

The default value can be 60 seconds, or it might be any other time value. In some embodiments, the DNS layer might not attempt to increase the TTL value all the way up to the default value, and it might instead stop increasing the TTL value when it is set to a value below the default value. Conversely, in some embodiments, the DNS layer might increase the TTL value to a value above the default value. In other embodiments, the DNS layer might not have a default value at all. In some embodiments, the DNS layer might simply increase the TTL value until an analysis of the metrics of the server instance or a collection of server instances informs the DNS layer to stop increasing the TTL value. These metrics can include the load of the particular server instance, such as the requests of the server instance when compared to other server instances, for example.

In some embodiments, the TTL value of a DNS record can be raised or lowered depending on whether the performance metrics of the server instance associated with the IP address in the DNS record is above or below certain thresholds. For example, the TTL value can be lowered if the load on a server instance is above 70%, where the load on a server instance can be the usage of any one or more resources associated with the server instance. As another example, the DNS value can be increased if the load on a server instance is below 40%. In other embodiments, there might be a range that the performance metrics of a server instance fall into which can determine the value of the TTL. For example, if the load of a server instance is below 60%, its corresponding TTL value can be set to 60 seconds. If the load of a server instance is between 60% and 70% its corresponding TTL value can be set to 30 seconds. If the load of a server instance is between 70% and 80%, its corresponding TTL value might be set to 15 seconds. If the load of a server instance is above 80%, its corresponding TTL value might be set to 0 seconds.

In some embodiments, some or all of the server instances can each be associated with an "Elastic" IP address. An Elastic IP address is a static IP address that is designed for dynamic cloud computing. An Elastic IP address is a public IP address, which is reachable from the Internet, and it can by rapidly remapped from one server instance to another server instance. If a server instance does not have a public IP address, a customer of a provider network, for example, can associate an Elastic IP address with an instance to enable the instance to communicate with the Internet, and other computers on the Internet. An Elastic IP address can be associated with a particular customer account in a provider network, for example. With an Elastic IP address, a customer can mask the failure of an instance or software by rapidly remapping the address to another instance in the customer's account.

In some embodiments, these "Elastic" IP addresses can be hosted in a highly available and scalable cloud DNS web service. In some embodiments, functionality described in this specification can be added to this cloud DNS web service to allow it to perform DNS based load balancing using dynamic DNS record TTL values. In other embodiments, this cloud DNS web service can handoff "Elastic" IP address information to a DNS layer of another service, such as a service for a specific customer. The cloud DNS web service can, for example, handoff a DNS packet to a DNS layer of another service, and this other DNS layer can have internal logic to perform the functionality described in this specification. The DNS layer of this other service can, for example, determine the IP address of a server instance to return to the client in response to a request, and can also determine the TTL value to return with the server instance. The cloud DNS web service will then honor the response that is sent from the DNS layer of the other service to the client. A request from a client to a DNS layer can comprise any number of intermediate components between the client to the DNS layer, including routers and resolvers. Requests from clients include embodiments where the DNS layer might receive actually receive a DNS request from a domain name resolver or resolvers. Domain name resolvers can, for example, determine the DNS servers responsible for a domain name in question by issuing a sequence of queries to DNS servers. Therefore, while the specification speaks of requests coming from clients, this should not be construed as limiting, but instead inclusive of embodiments where DNS servers receive requests from other components, such as resolvers, and embodiments where the resolvers are the devices that respond directly to clients.

In some embodiments, when the DNS layer receives a DNS request, instead of returning multiple IP addresses with the response and letting the client rotate through those IP addresses themselves, the DNS layer can instead only return one IP address. The DNS layer will pick the actual server instance that it wants traffic from the client to go to, and only return that one IP address with the response. The DNS layer can, in addition, determine the TTL value that is appropriate for that server instance, and return the single IP address with the TTL value to the client. The determined TTL might be solely or partially based on the current load of the server instance that the DNS layer is targeting for this client. In some embodiments, the TTL value can be a normalization ratio of the measure of the load of the server instance. The DNS layer might determine the TTL value by multiplying the default value, for example 60 seconds, by the percentage of the non-loaded capacity of any resource associated the server instance. For example, the TTL value can be computed by (100%−load of server instance)*60 seconds. In this way, the higher the load, the lower the computed TTL value will be.

When the TTL value for a DNS record is low, a client can only use the DNS record for that short amount of time. After the TTL time has expired, the client needs to send another request to the DNS service, ask for a new set of records, and the new set of DNS records will probably not include to the IP address of the instance or instances with a high load. In this way the instances with a higher load will be receive fewer requests as fewer and fewer clients will have an active DNS record that includes an IP address for one of those instances with a higher load. By shortening the TTL value in a DNS record, the clients that have cached the IP address in that DNS record (where the clients caching the IP address in that DNS record includes the embodiments where the resolvers have cached the IP address in that DNS record) will be forced to ask for a new DNS record, since the DNS record with the shortened TTL value will become stale in the shortened amount of time specified by the TTL value.

In some embodiments, the DNS layer can implement a round robin strategy to determine the next server instance for a DNS request. In other embodiments, the DNS layer can receive performance metrics from the server instances, for example the received requests per second of one or more server instances. Based on those metrics, the DNS layer can determine which IP addresses associated with the server instances to select. For example, the DNS layer can select IP addresses associated with highly loaded instances, or instances with a higher number of requests per second, less frequently, and can select IP addresses associated with more lightly loaded instances, or instances with fewer requests per second, more frequently. If a server instance is too highly loaded, or has too many requests per second, the DNS layer might not select the IP address associated with that server instance at all, until the metrics of the server instance indicate that it is ready to handle additional requests. In this case the IP address will be taken out of a rotation or selection process for IP addresses in the DNS layer.

Instead of, or in addition to, the metrics instance-level or host-level metrics, the DNS layer may also use other types of metrics, such as networking level metrics in some embodiments. The DNS layer can analyze the metrics of the service network, including the metrics of the border routers or internal routers in order to perform the DNS-based load balancing. In some embodiments the DNS layer can either receive or compute an estimate of the load coming from specific clients. The load coming from clients could be incorporated in both the determination of the IP address and in the determination of the TTL value. The load coming from a specific client of clients can be incorporated with the load of the server instances when the DNS layer determines an IP address of a server instance to provide, or when it determines a TTL value to associate with the server instance.

In some embodiments, the DNS layer might decide to return multiple IP addresses to a specific client if the load of that client is above a certain threshold. In this case, a single server instance might not be able to handle the high load of a particular client by itself, and therefore returning multiple IP addresses to a client will allow the load of the client to be spread across the server instances associated with those multiple IP addresses. The multiple IP addresses can be determined in a round-robin fashion, or can be determined using the metrics of the server instances to, for example, return only those server instances with lighter loads. Else, or in combination with returning multiple IP addresses, the DNS layer can also set the TTL value of the returned DNS record to be a low number such that the client can only make one request, after which it has to make a new request of the DNS layer for a new set of records.

In some embodiments, the DNS layer might be load balancing across a series of server instances or server hosts. In some embodiments, these server instances might be part of a content delivery network that might securely delivers data, videos, applications, or APIs to clients or customers. In some embodiments, this DNS based load balancing technique can be used in combination or in conjunction with other load balancing techniques. For example, instead of load balancing across a series of server instances, the DNS based load balancer might load balance across a series of other conventional load balancers, that in turn load balance across a collection of server instances. As another example, the DNS based load balancer might load balance across a combination of server instances and other load balancers. In some embodiments, the DNS based load balancers can, for example, load balance across server farms located in separate geographical regions, where each server farm is individually load balanced by their own conventional load balancer. The DNS based load balancer would, in this example, load balance across the IP addresses associated with the separate load balancers located in each server farm, instead of load balancing across server instances.

Embodiments of DNS-Based Load Balancing Via Dynamic DNS Record TTLs

Embodiments of a DNS-based load balancing method are described that may be implemented on or by DNS servers in load balanced systems. The DNS-based load balancing method may leverage a DNS-based protocol to establish multiple paths for at least some connections between client and server instances in load balanced systems.

FIG. 1 illustrates an embodiment of a DNS-based load balanced system in which dynamic DNS record TTLs are implemented. A DNS server that implements an embodiment of the DNS-based load balancing method is shown as DNS server 100. The DNS server 100 receives a DNS request 112 from a client 111 of one or more clients in a client system 110. A request from a client 111 to a DNS server 100 can comprise any number of intermediate components between the client 111 to the DNS server 100, including routers and resolvers. Requests from clients can include embodiments where the DNS layer might receive actually receive a DNS request from a domain name resolver or resolvers. Domain name resolvers can, for example, determine the DNS servers responsible for a domain name in question by issuing a sequence of queries to DNS servers. Therefore, while the figure shows requests coming directly from clients, this should not be construed as limiting, but instead inclusive of embodiments where DNS servers actually receive requests from other components, such as resolvers, and embodiments where the resolvers are the devices that respond directly to clients. This is also inclusive of embodiments where the resolver uses a cached or retained version of a DNS record to respond to the client, and where a resolver makes a DNS request to the DNS server without being prompted to by any specific client. The broad concept of a DNS server receiving a DNS request from a client can include all of these embodiments and other embodiments not described. The DNS Request 112 includes or references a domain name 113 that the client would like to have mapped or translated to a network address, such as an IP address.

The domain name 113 received by the DNS server 100 can be mapped to any one of a plurality of devices or virtual devices. The devices or virtual devices can be any kind of networked devices or virtual devices such as servers, server instances, data storage hosts or instances, database hosts or instances, or simply general purpose computers. The further description of FIG. 1 will describe the embodiment where the domain name is mapped to a plurality of server instances, such as a collection of server instances 120 that are mapped to the same domain name, where the collection contains specific server instances 120A, 120B, 120C, 120D . . . 120N. The number of server instances in the plurality of server instances can be any number and is not limited to any specific number of instances.

The DNS server 100 receives performance metrics 124 regarding the server instances 120A, 120B, 120C, 120D . . . 120N in the collection of server instances 120. The DNS server can receive the performance metrics directly from the server instances 120A, 120B, 120C, 120D . . . 120N or from an intermediary such as a metric monitoring service. The metric monitoring service might receive metrics from an application or service executed on the server instances, where each application or service collects performance metrics regarding their particular server instance on which they are being executed. The application or service can send the metrics for their server instance to the metrics monitoring service, or the metrics monitoring service can request the metrics from the applications or services. The performance metrics 124 can include the received requests per second of one or more server instances. Instead of, or in addition to, the instance-level or host-level metrics, the DNS layer may also use other types of performance metrics, such as networking level metrics in some embodiments. The load of the server instance can include the usage of any one or more of the resources that these metrics indicate, such as the networking resources that the networking level metrics indicate. The performance metrics might include one or more load values in some embodiments, or a load of a server instance might be calculated or determined from the performance metrics in some embodiments. The DNS layer can analyze the metrics of the service network, including the metrics of the border routers or internal routers in order to perform the DNS-based load balancing.

The DNS server 100 determines an IP address 105 of a server instance 120A, 120B, 120C, 120D . . . 120N in the collection of server instances 120 to use in responding to the DNS request. In order to determine an IP address 105, the DNS server 100 uses a load balancing scheme to determine the IP address of which server instance 120A, 120B, 120C, 120D . . . 120N of the collection of server instances 120 will be selected. The DNS server 100 can determine the IP address 105 using the performance metrics 124 or without using the performance metrics, such as by using a traditional round-robin scheme. The selected IP address 102 will be included in a DNS response 101 that is sent back to the requesting client 111. The client will use this specific IP address 102 as its mapping of the domain name 113. Where the domain name 113 can potentially be mapped to the IP address of any one of the server instances 120C, 120D . . . 120N, the client 111 will use the IP address 102 of a specific server instance for all communications 122A with the domain name for a specific period of time, where the period of time is specified by the TTL value 103.

After determining which server instance will be selected, the DNS server 100 determines 104 a TTL value 103 that will also be included in the response to the DNS request 101. In at least some embodiments, the TTL is specific for each of the IP addresses of each of the server instances that are returned by the DNS layer in response to a DNS request. In some embodiments, the TTL value is initially set to a default value. The DNS server 100 may keep the current TTL value for each of the server instances 120A, 120B, 120C, 120D . . . 120N in its memory, or in a local database. The DNS server can then use the current TTL value, along with the performance metrics, to calculate or determine a new TTL value 104, where this new TTL value 103 will be included in the DNS response 101. The new TTL value 103 is sent in the DNS response 101, and also replaces the old current TTL value as the new current TTL value. The new TTL value can, in some embodiments, be determined 104 on an as needed basis, such as when the IP address its corresponding server instance has been determined to be included in a DNS response. In other embodiments, the TTL value can be determined on a continual or rolling basis, such as when the DNS server receives or analyzes new server performance metrics 106. In these embodiments, the TTL value will already be updated or determined 104, such that the DNS server can simply use this TTL value in the DNS response 103 whenever it is needed. The DNS Response 101 is returned to the client 111. Again, this is a very broad concept and, like the request, can include embodiments where there are any number of intermediate components between the client 111 to the DNS server 100, including routers and resolvers. Responses to clients can include embodiments, for example, where the DNS server might receive actually respond to a resolver. All the embodiments associated with the DNS request can also be associated with the DNS response.

In some embodiments, the DNS server 100 can adjust the TTL value associated with a server instance based on whether it detects a load imbalance, such as a request imbalance, associated with that server instance. For instance, if the DNS server detects a load imbalance for a server instance 120A, as compared to the collection of server instances 120, the current TTL value associated with that instance 120A is lowered to form a new current TTL value. Conversely, once there isn't any load imbalance across the collection of server instances 120, the DNS server 100 can slowly raise the TTL values that aren't at the default 60 seconds. More specifically, if the DNS layer does not detect a load imbalance for a server instance (such as 120A), it gradually raises the TTL value associated with that server instance (120A). The raising of the TTL value associated with an instance might occur in smaller increments than the lowering of the TTL value. While in this embodiment the load imbalance is a request imbalance, imbalances are not limited to request imbalances, and can be imbalances of any measurable metric regarding any component or network in the system. In other embodiments, the TTL value associated with a server instance can be raised or lowered depending on whether the performance metrics of the server instance is above, below, or between certain thresholds. For example, the TTL value can be lowered if the load on a server instance is above 70%. As another example, the DNS value can be increased if the load on a server instance is below 40%. In other embodiments, there might be a range that the performance metrics of a server instance fall into which can determine the value of the TTL. For example, if the load of a server instance is below 60%, its corresponding TTL value can be set to 60 seconds. If the load of a server instance is between 60% and 70% its corresponding TTL value can be set to 30 seconds. If the load of a server instance is between 70% and 80%, its corresponding TTL value might be set to 15 seconds. If the load of a server instance is above 80%, its corresponding TTL value might be set to 0 seconds.

When a TTL value for a server instance is lowered, this means that clients or resolvers who have the domain name mapped to that server instance will make more frequent DNS queries, thus resulting in those clients receiving IP addresses for other server instances. This would mean that more traffic from the imbalanced or highly loaded server instance will get spread to other server instances. In some embodiments, after modifying the TTL value, the DNS layer waits for some period for the default TTL value to expire, and for new DNS records with the lower TTL value to be handed back to requesting clients. If the imbalance still persists after some period of time, in some embodiments, the DNS layer again lowers the TTL value associated with that instance. In some embodiments, the DNS layer can continue on this path until the TTL value reaches 0 for an imbalanced or highly loaded server host.

When a TTL value for a server instance is raised, this means that clients or resolvers who have the domain name mapped to that server instance will make less frequent DNS queries. Make less frequent DNS queries results in clients keeping their mapping of the IP address that was previously assigned by the DNS layer for the domain name 113. This means clients will continue to send traffic to the server instance that was assigned to them for a longer period of time. In some embodiments, after gradually raising the TTL value, the DNS layer waits for some period for the default TTL value to expire, and for new DNS records with the higher TTL value to be handed back to requesting clients. If the DNS layer still does not detect a load imbalance, such as a request imbalance, for the server instance after some period of time, or if a load of the server instance is indicates that it is not overloaded, then, in some embodiments, the DNS layer again raises the TTL value for the DNS records associated with that instance. In some embodiments, the DNS server 100 continues on this path until the TTL value reaches the default value again.

Figure 2:
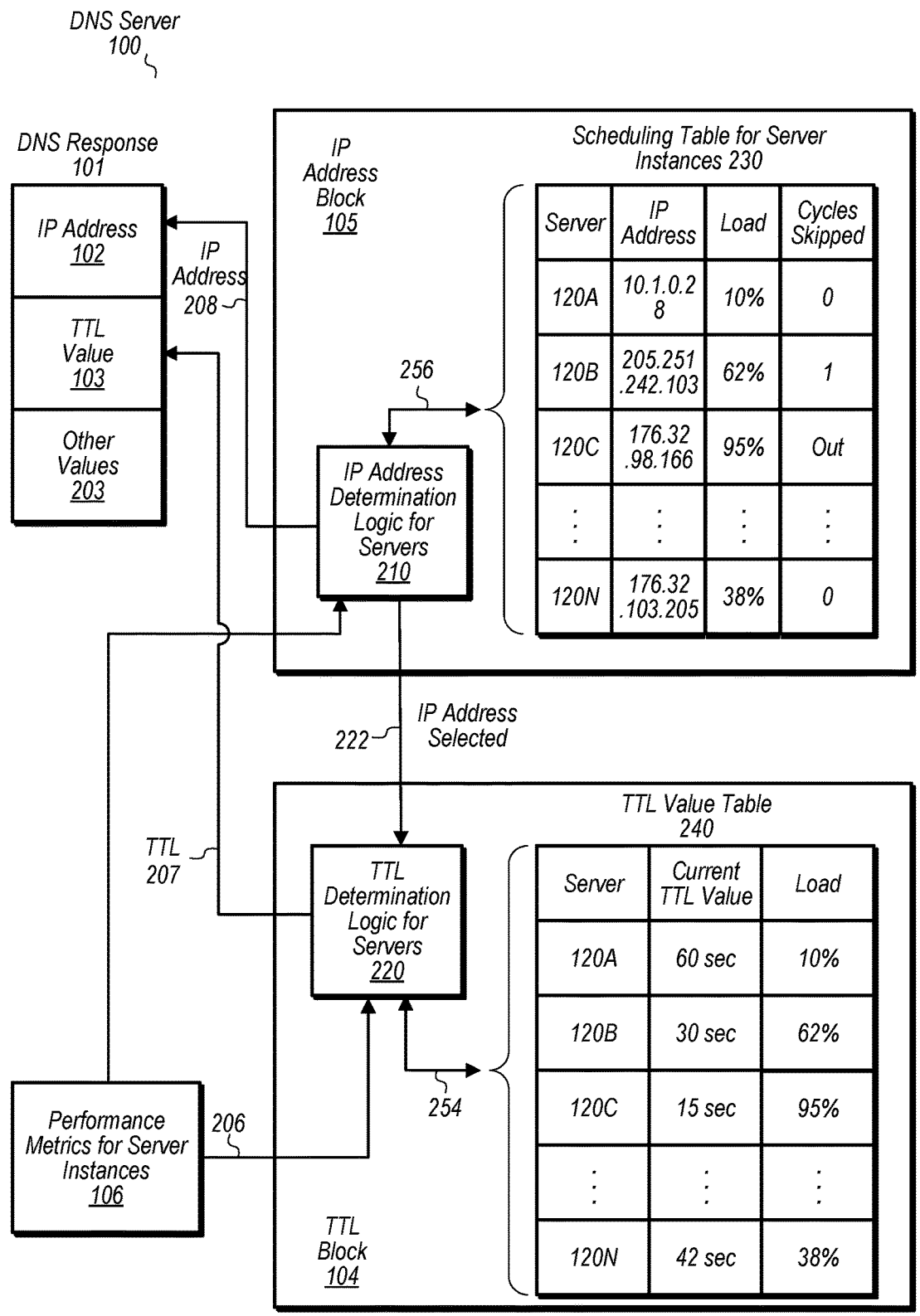
FIG. 2 illustrates an embodiment of the operation of a DNS server that provides dynamic DNS record TTLs in a DNS-based load balanced system.

FIG. 2 illustrates an embodiment of the operation of a DNS server that provides dynamic DNS record TTLs in a DNS-based load balanced system. FIG. 2 depicts one embodiment of a more detailed operation of the IP address block 105 that determines the IP address 102, and the TTL block 104 that determines the TTL value 103 in the DNS response 101. The DNS response can also include other values or information 203. The IP address block 105 includes IP address determination logic for servers 210 accesses or uses 256 a table of server instances 230 that can be used for scheduling the IP addresses. The IP address determination logic for servers 210 can either be hardware or software implemented. The IP address determination logic for servers 210 can use a load balancing scheme to determine the IP address to return in response to a given DNS request, or it can use some other scheme or algorithm to make the determination. As an example of a load balancing scheme, the IP address determination logic for servers 210 might use a round-robin load balancing scheme, or it might randomly pick the next IP address to return using a random or pseudo-random number.

The scheduling table for server instances 230 is an embodiment of information that the IP address determination logic for servers 210 can use in order to determine the IP address 102 to include in the DNS response 101. The table includes a "server," "IP address," "load," and "cycles skipped" column. The table associates a server instance, indicated in the "server" column, with an IP address. The table further associates each server instance with the current load of that server instance, indicated in the "Load" column, and with the number of cycles that the IP address determination logic for servers 210 has skipped that IP address when determining which IP address to send, indicated in the "Cycles Skipped" column. When a server instance is more heavily loaded, the IP address determination logic 210 might not provide the IP address associated with that server instance, if it has selected that server instance through its load balancing scheme.

For example server 120A is only 10% loaded and so has not been skipped in any cycles. Instead, its IP address has been provided every time it has been selected through the load balancing scheme, which in one embodiment is a round-robin load balancing scheme. Server 120N is only 38% loaded, and so it has not been skipped in any cycles either. Server 120B is 62% loaded, and it has been skipped for 1 cycle. When its IP address was otherwise determined to be provided, the IP address determination logic 210 decided not to provide its address in a DNS response 101 for 1 cycle, because its load was too high, either in relation to a specific threshold, or in relation to the load of the other servers. The IP address determination logic 210 instead provided an IP address of another more lightly loaded server instance, instead of the IP address of server instance 120B during that cycle. The IP address determination logic 210 uses the absolute or relative load of a server instance to determine how many cycles to skip before the IP address of a server instance is provided again. Server 120C is 95% loaded, and so it is listed as being "Out." In other words, the IP address determination logic 210 will not provide the IP address of server instance 120C again until its load becomes less, either absolutely or in relation to the other server instances. When a server instance becomes heavily loaded, or other performance metrics indicate high utilization rates, the IP address determination logic 210 might not provide the IP address of that server instance again until the performance metrics indicate lower utilization rates.

As stated previously, the IP address block 105 can receive performance metrics for the server instances 106. These performance metrics can include, for example, the received requests per second of one or more server instances. Based on those metrics, the IP address determination logic 210 can determine which IP addresses associated with the server instances to select. For example, the IP address determination logic 210 can select IP addresses associated with highly loaded instances, such as instances with a higher number of requests per second, less frequently, and can select IP addresses associated with more lightly loaded instances, such as instances with fewer requests per second, more frequently. For example, in one embodiment, the IP address determination logic determines the IP addresses of server instances 120A and 120N more frequently than the IP addresses of 120B or 120C. If a server instance is too highly loaded, such as having too many requests per second, the IP address determination logic 210 might not select the IP address associated with that server instance at all, until the metrics of the server instance indicate that it is ready to handle additional requests. In this case the IP address will be taken out of a rotation or selection process for IP addresses in by the IP address determination logic 210.

In one embodiment, the TTL block 104 includes TTL determination logic for servers 210 which accesses or uses 254 a TTL value table 240 that can be used for determining the TTL value. The TTL determination logic for servers 220 can either be hardware or software implemented. The TTL determination logic for servers 220 use the performance metrics for server instances 106 and the IP address or server instance that was selected 222 to determine the TTL values to return in response to a given DNS request. The TTL value table 240 is an embodiment of information that the TTL determination logic for servers 220 can use in order to determine the TTL 103 to include in the DNS response 101. The table includes a "Server," "Current TTL value," and "Load" columns. The table associates a server instance, indicated in the "server" column, with a current TTL value. The table further associates each server instance with the current load of that server instance, indicated in the "Load" column, where the current load is received or determined from the performance metrics for server instances 106.

In some embodiments, the TTL determination logic 220 can adjust the TTL value associated with a server instance based on whether it detects a load imbalance, such as a request imbalance, associated with that server instance. For instance, if the TTL determination logic 220 detects a load imbalance for a server instance 120C, as compared to the collection of server instances 120, the current TTL value associated with that instance 120C is lowered to form a new current TTL value. Conversely, once there isn't any load imbalance across the collection of server instances 120, the DNS server 100 can slowly raise the TTL values that aren't at the default 60 seconds. In other embodiments, if the TTL determination logic 220 does not detect a load imbalance for a server instance (such as 120N), it gradually raises the TTL value associated with that server instance (120N). The raising of the TTL value associated with an instance might occur in smaller increments than the lowering of the TTL value. In other embodiments, the TTL value associated with a server instance can be raised or lowered depending on whether the performance metrics of the server instance is above, below, or between certain thresholds.

For example, in one embodiment shown in FIG. 2, server instance 120A is only 10% loaded and so its current TTL value is set at the default 60 seconds. Server instance 120B is 62% loaded and so its TTL value has been set to half of the default value, or 30 seconds. Server instance 120C is 95% loaded, and its TTL value has been determined set to half of the 30 seconds value, which would be 15 seconds. In some embodiments, if the load of server instance 120C stays at 95% then the TTL determination logic would further reduce its corresponding TTL value. After a sufficient waiting period has elapsed, the TTL determination logic, in some embodiments, might set the TTL value to 7 seconds. In some embodiments, the TTL determination logic might set the TTL value for server instance 120C to be 0 seconds if the load of server instance was sufficiently large for a long enough time, either on an absolute level or in relation to the loads of the other server instances. In the embodiment shown in FIG. 2, server instance 120N is 38% loaded and its TTL value has been gradually increased from 30 seconds up to 42 seconds. The increase in the TTL value for server instance 120N is a fewer number of seconds than it was decreased. In other words, the rate of decrease of the TTL value for server instance 120N was greater than the subsequent rate of increase of the TTL value. As an example, previously server instance 120N had its TTL value cut from 60 seconds to 30 seconds when its load was higher. Now that its load is only 38% its TTL value has been gradually increased by the TTL determination logic 220, in either one or multiple cycles, to 42 seconds.

While FIG. 2 shows the scheduling table for server instances 230 and the TTL value table 240 as separate tables that are accessed by separate logic blocks (210 and 220) in one embodiment, in other embodiments they might be combined into one table that are accessed by both logic blocks. In other embodiments the logic blocks might be combined into one logic block. In some embodiments, the information contained in the scheduling table for server instances 230, and the TTL value table 240, might be contained in other information structures, such as a database or linked list, or the information simply might be stored in a computer readable medium in such a way that the information can be accessed by the logic blocks. The DNS server 100 might store a collection of "A records" for some or all of the server instances that will then be provided in a DNS response 101. The "A records" might contain a TTL value that is updated periodically in one embodiment. In other embodiments, the TTL value might be updated whenever that "A record" is to be provided in a DNS response 101, or the TTL value might be updated whenever newly received or analyzed performance metrics 106 dictate the need to update the TTL value in the "A record." There are other ways to update the TTL value, and the various embodiments described here should not be construed as limiting. The "A records" would then be accessed by the various logic blocks in order to determine the IP address 102 and the TTL value 103 for the DNS response 101.

DNS-Based Load Balancer in a Provider Network

This section describes example provider network environments in which embodiments of the DNS-based load balancing method and apparatus may be implemented. However, these example provider network environments are not intended to be limiting.

Figure 3A:
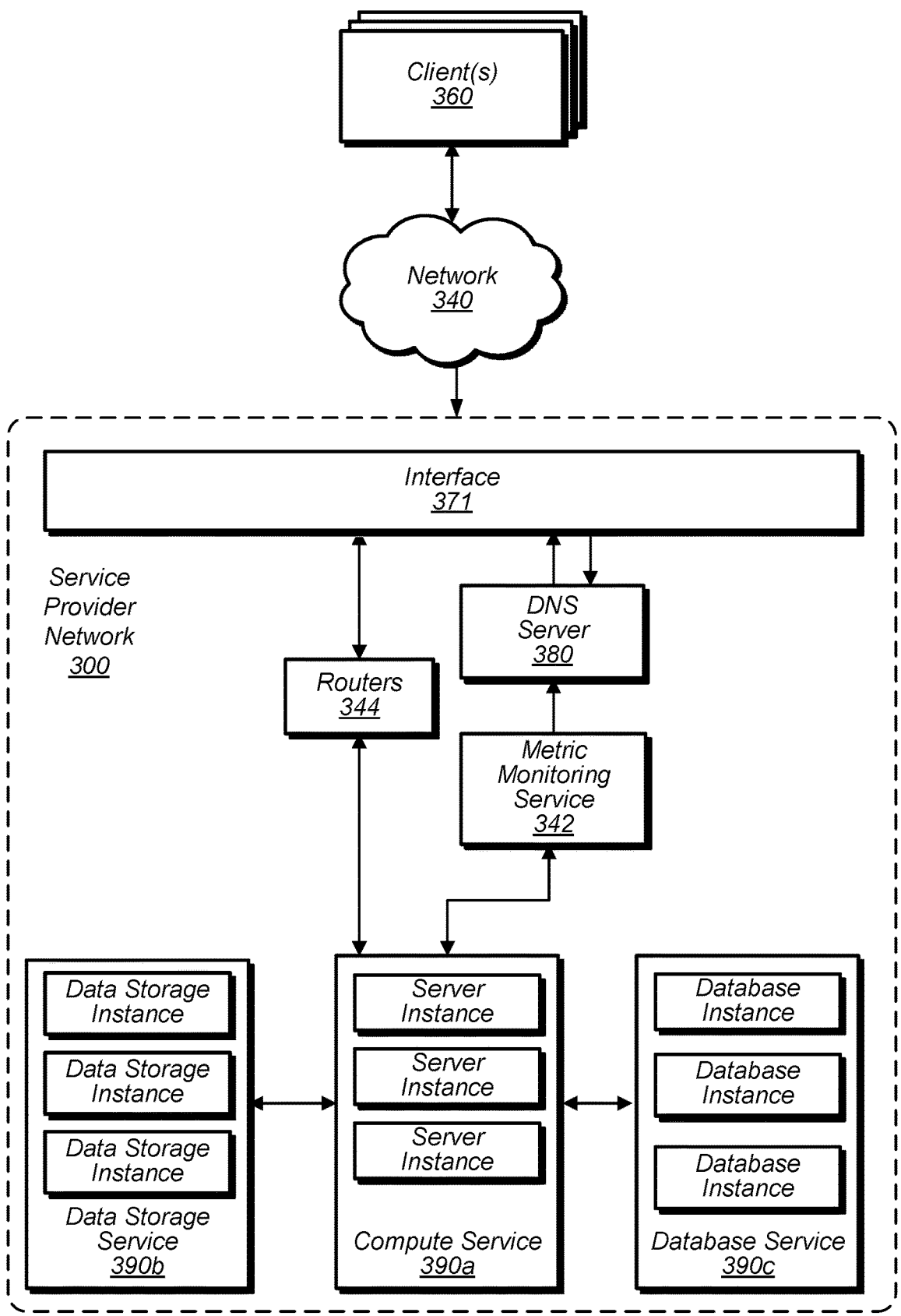
FIG. 3A illustrates a DNS-based load balancer implementation in an example provider network environment, according to at least some embodiments.
Figure 3B:
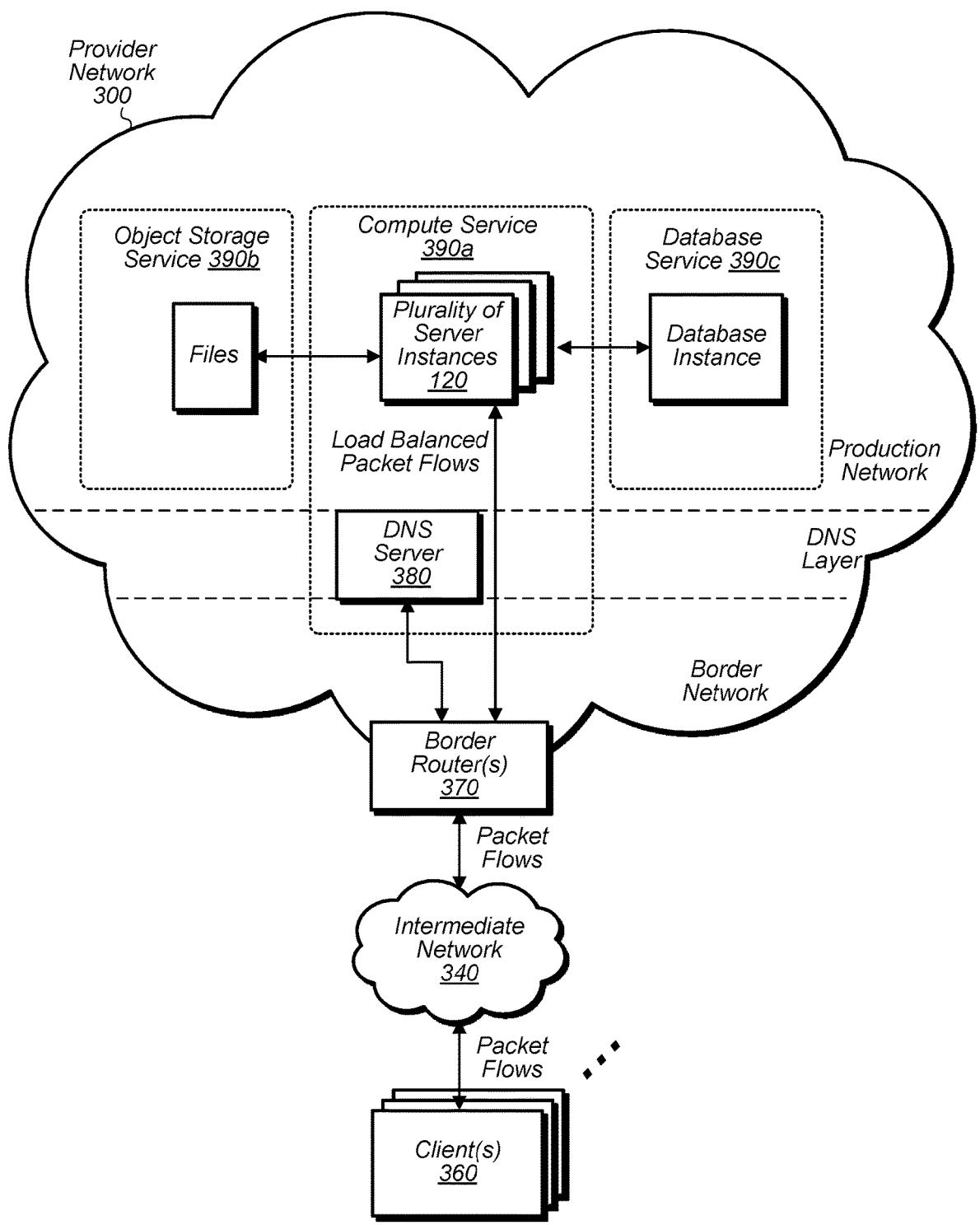
FIG. 3B illustrates a DNS-based load balancer implementation in an example provider network environment, according to at least some same or different embodiments.

FIGS. 3A and 3B illustrate a DNS-based load balancer implementation in an example provider network environment, according to at least some embodiments. A provider network 300 may provide resource virtualization to clients via one or more virtualization services that allow clients to access, purchase, rent, or otherwise obtain instances of virtualized resources, including but not limited to computation and storage resources, implemented on devices within the provider network or networks in one or more data centers. In some embodiments, private IP addresses may be associated with the resource instances; the private IP addresses are the internal network addresses of the resource instances on the provider network 300. In some embodiments, the provider network 300 may also provide public IP addresses and/or public IP address ranges (e.g., Internet Protocol version 4 (IPv4) or Internet Protocol version 6 (IPv6) addresses) that clients may obtain from the provider network 300.

Conventionally, the provider network 300, via the virtualization services, may allow a client of the service provider (e.g., a client that operates clients 360) to dynamically associate at least some public IP addresses assigned or allocated to the client with particular resource instances assigned to the client. The provider network 300 may also allow the client to remap a public IP address, previously mapped to one virtualized computing resource instance allocated to the client, to another virtualized computing resource instance that is also allocated to the client. Using the virtualized computing resource instances and public IP addresses provided by the service provider, a client of the service provider such as the operator of clients 360 may, for example, implement client-specific applications and present the client's applications on an intermediate network 340, such as the Internet. Either the clients 360 or other network entities on the intermediate network 340 may then generate traffic to a destination domain name published by the clients 360. First, either the clients 360 or the other network entities make a DNS request to the DNS server 380 for an IP address associated with the domain name. A DNS server 380 in the DNS layer responds with a public IP address of a server instance of a plurality of server instances in a compute service 390*a* of the provider network 309. Then the clients 360 or other network entities on the intermediate network 340 may then generate traffic to public IP address that was received by the DNS layer. The traffic is routed to the service provider data center, and at the data center is routed, via a network substrate, to the private IP address of the virtualized computing resource instance currently mapped to the destination public IP address. Similarly, response traffic from the virtualized computing resource instance may be routed via the network substrate back onto the intermediate network 340 to the source entity.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 300; a client may then assign their allocated public IP addresses to particular resource instances allocated to the client. These public IP addresses may be referred to as client public IP addresses, or simply client IP addresses. Instead of being assigned by the provider network 300 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. A client IP address can be an Elastic IP address. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

A provider network 300 may provide a compute service 390*a* implemented by physical server nodes to clients 360, which includes a plurality of server instances 120. The compute service also contains many other server instances for many other clients and other customers of the provider network 300. As another example, the provider network provides a virtualized data storage service or object storage service 390*b* which can include a plurality of data storage instances implemented by physical data storage nodes. The data storage service or object storage service 390*b* can store files for the client, which are accessed by the appropriate server instance of the client. As another example, the provider network might provide a virtualized database service 390*c* implemented by database nodes, which includes at least one database instance for a client. A server instance pertaining to the client in the compute service can access a database instance pertaining to the client when needed. The database service and data storage service also contain multiple files or database instances that pertain to other clients and other customers of the provider network 300. The provider network can also include multiple other client services that pertain to one or more customers. The clients 360 may access any one of the client services 390*a*, 390*b*, or 390*c*, for example, via an interface 371, such as one or more APIs to the service, to obtain usage of resources (e.g., data storage instances, or files, or database instances, or server instances) implemented on multiple nodes for the service in a production network portion of the provider network 300. Communication from the clients to an instance of a service can be routed to the appropriate instance by a series of routers 344. Server nodes in the compute service 390*a* may each implement a server, for example a web server or application server. One or more DNS-based load balancers implemented by one or more DNS servers 380 may be implemented in a load balancer layer between the border network and the production network. Border router(s) 370 may receive packets (e.g., TCP packets) in packet flows from clients 360 via an intermediate network 340 such as the Internet, and forward the packets to the appropriate server node or instance, or it might forward the packets containing a public IP address to an apparatus that can map the public IP address to a private IP address. The packets may be targeted at the public IP address(es) included in DNS responses to DNS requests by the DNS server 380 in the DNS layer. The DNS server 380 may provide public IP addresses in response to requests such that the packet flows are distributed among the nodes or instances that are mapped to a particular domain name, such among a plurality of server nodes and/or server instances that pertain to the clients of a customer. The DNS servers 380 implementing a DNS load balancer may use the procedures described herein to determine target server nodes or server instances 120 for the packet flows and to facilitate traffic between the servers and the clients 360.

The DNS server can receive the performance metrics from an intermediary such as a metric monitoring service 342. The metric monitoring service 342 might receive metrics from an application or service executed on the server instances 120 of the compute service 390*a*, or the data storage instances of the data storage service 390*b* or the database instances of the database service 390*c*, where each application or service collects performance metrics regarding their particular instance on which they are being executed. The application or service can send the metrics for their server instance to the metrics monitoring service 342, or the metrics monitoring service 342 can request the metrics from the applications or services. The performance metrics can include, for example, the received requests per second of one or more instances. Instead of, or in addition to, the instance-level or host-level metrics, the DNS layer may also use other types of metrics, such as networking level metrics in some embodiments. The DNS layer can analyze the metrics of the service network, including the metrics of the border routers or internal routers in order to perform the DNS-based load balancing.

Functionality of DNS-Based Load Balancing Via Dynamic DNS Record TTLs

Figure 4:
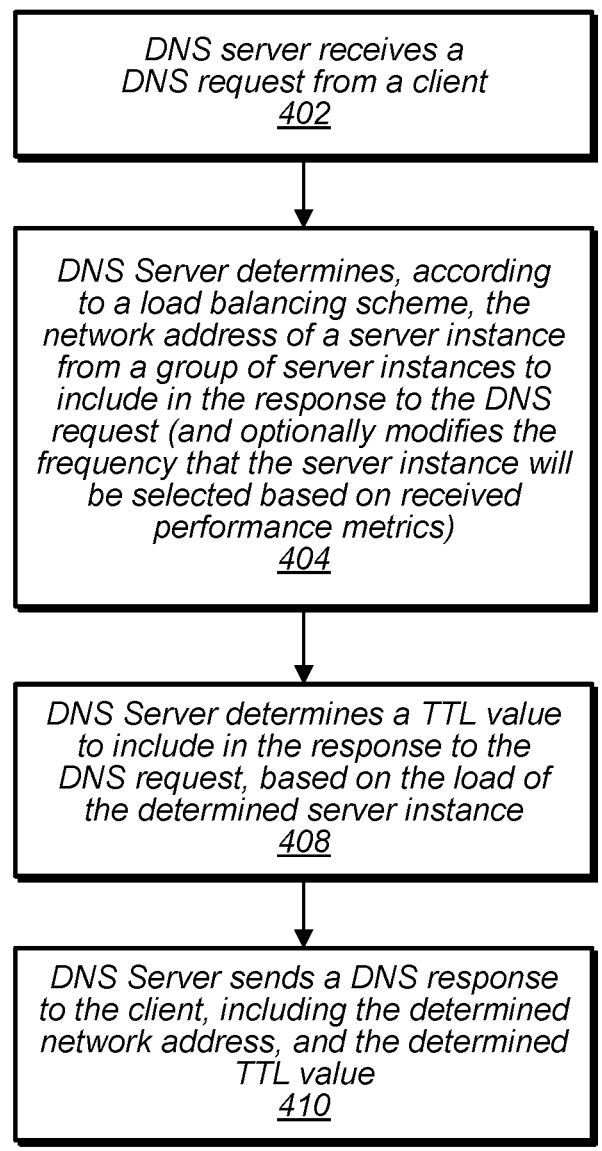
FIG. 4 is a flowchart of a DNS-based load balancing method that provides dynamic DNS record TTLs, according to at least some embodiments.

FIG. 4 is a flowchart of an embodiment of a DNS-based load balancing method that provides dynamic DNS record TTLs, according to at least some embodiments. The method begins in block 402 where a DNS server receives a DNS request from a client. The method then transitions to block 404, where the DNS Server determines, according to a load balancing scheme, the network address of a server instance from a group of server instances to include in the response to the DNS request. In addition, this step also optionally includes modifying the frequency that a server instance will be selected based on received performance metrics of the server instance, or other server instances. For example, if the load of a server instance is too high, that server instance may be skipped and the network address of another server instance may instead be provided. The method then transitions to block 408 where the DNS Server determines a TTL value to include in the response to the DNS request, based on the load of the determined server instance. The method then transitions to block 410 in which the DNS Server sends a DNS response to the client, including the determined network address, and the determined TTL value.

Figure 5:
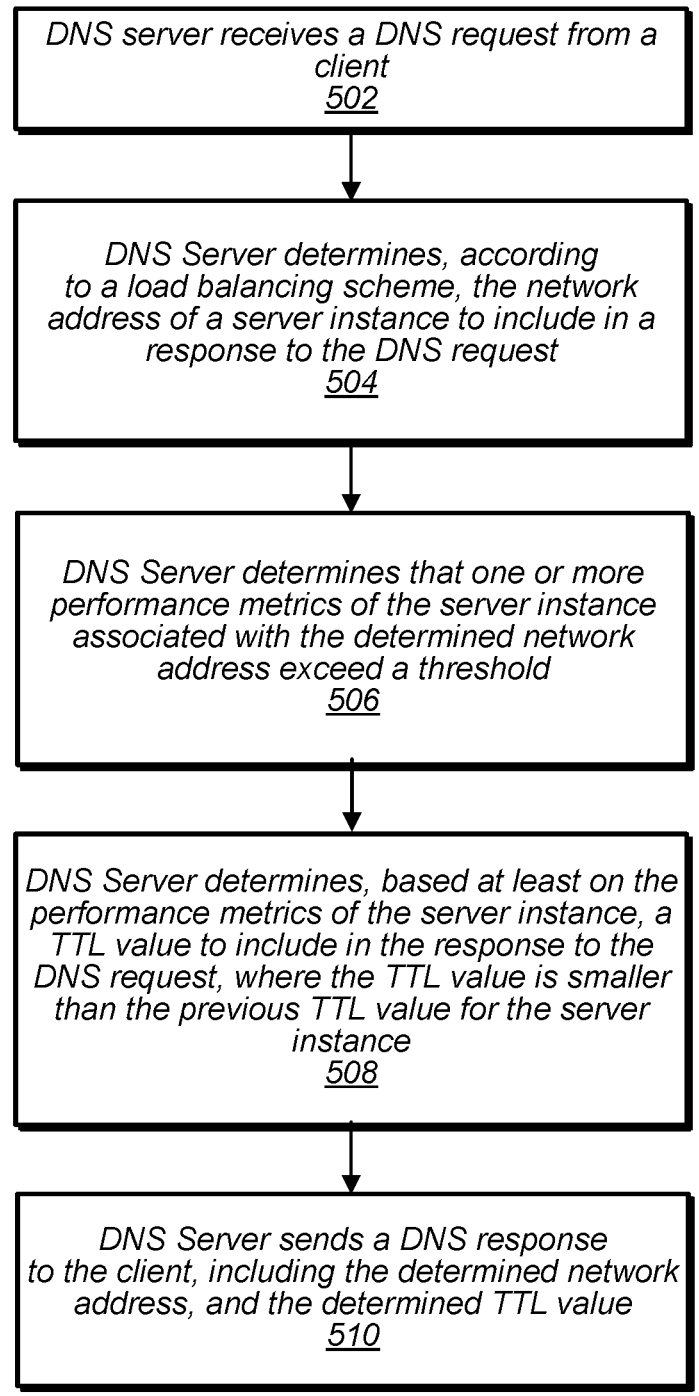
FIG. 5 is a flowchart of a DNS-based load balancing method that provides dynamic DNS record TTLs, including decreasing the provided TTL value when load of a server instance is above a threshold, according to at least some embodiments.

FIG. 5 is a flowchart of a DNS-based load balancing method that provides dynamic DNS record TTLs, including decreasing the provided TTL value when load of a server instance is above a threshold, according to at least some embodiments. The method begins in block 502 where a DNS server receives a DNS request from a client. The method then transitions to block 504 in which the DNS Server determines, according to a load balancing scheme, the network address of a server instance to include in a response to the DNS request. The method then transitions to block 506 in which the DNS Server determines that one or more performance metrics of the server instance associated with the determined network address exceed a threshold. The method then transitions to block 508 in which the DNS Server determines, based at least on the performance metrics of the server instance, a TTL value to include in the response to the DNS request, where the TTL value is smaller than the previous TTL value associated with the server instance. The method then transitions to block 510 in which the DNS Server sends a DNS response to the client, including the determined network address, and the determined TTL value.

Figure 6:
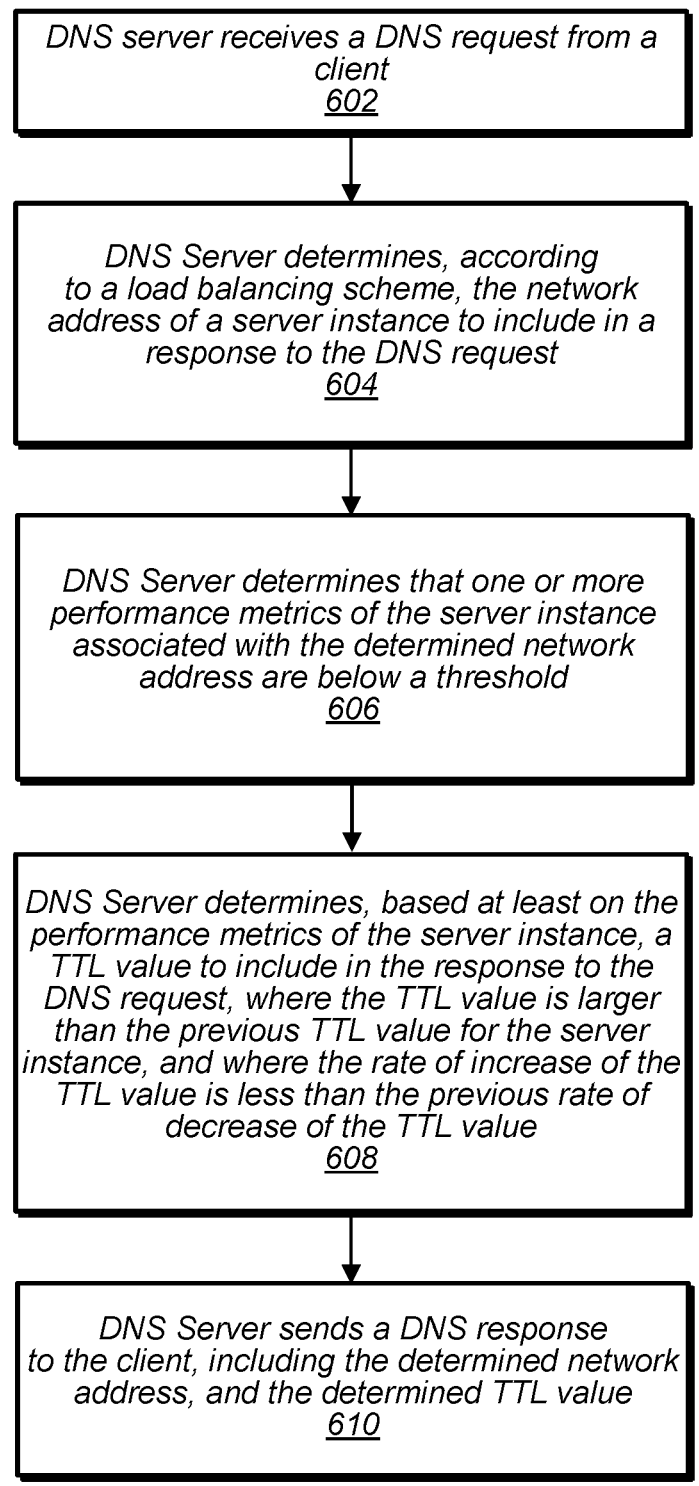
FIG. 6 is a flowchart of a DNS-based load balancing method that provides dynamic DNS record TTLs, including increasing the provided TTL value when load of a server instance is below a threshold, according to at least some embodiments.

FIG. 6 is a flowchart of a DNS-based load balancing method that provides dynamic DNS record TTLs, including increasing the provided TTL value when load of a server instance is below a threshold, according to at least some embodiments. The method begins in block 602 where a DNS server receives a DNS request from a client. The method then transitions to block 604 in which the DNS Server determines, according to the load balancing scheme, the network address of the server instance to include in a response to the DNS request. The method then transitions to block 606 in which the DNS Server determines that one or more performance metrics of the server instance associated with the determined network address are below a threshold. The method then transitions to block 608 in which the DNS Server determines, based at least on the performance metrics of the server instance, a TTL value to include in the response to the DNS request, where the TTL value is larger than a previous TTL value for the server instance, and where the rate of increase of the TTL value is less than a previous rate of decrease of the TTL value. The method then transitions to block 610 in which the DNS Server sends a DNS response to the client, including the determined network address, and the determined TTL value.

Figure 7:
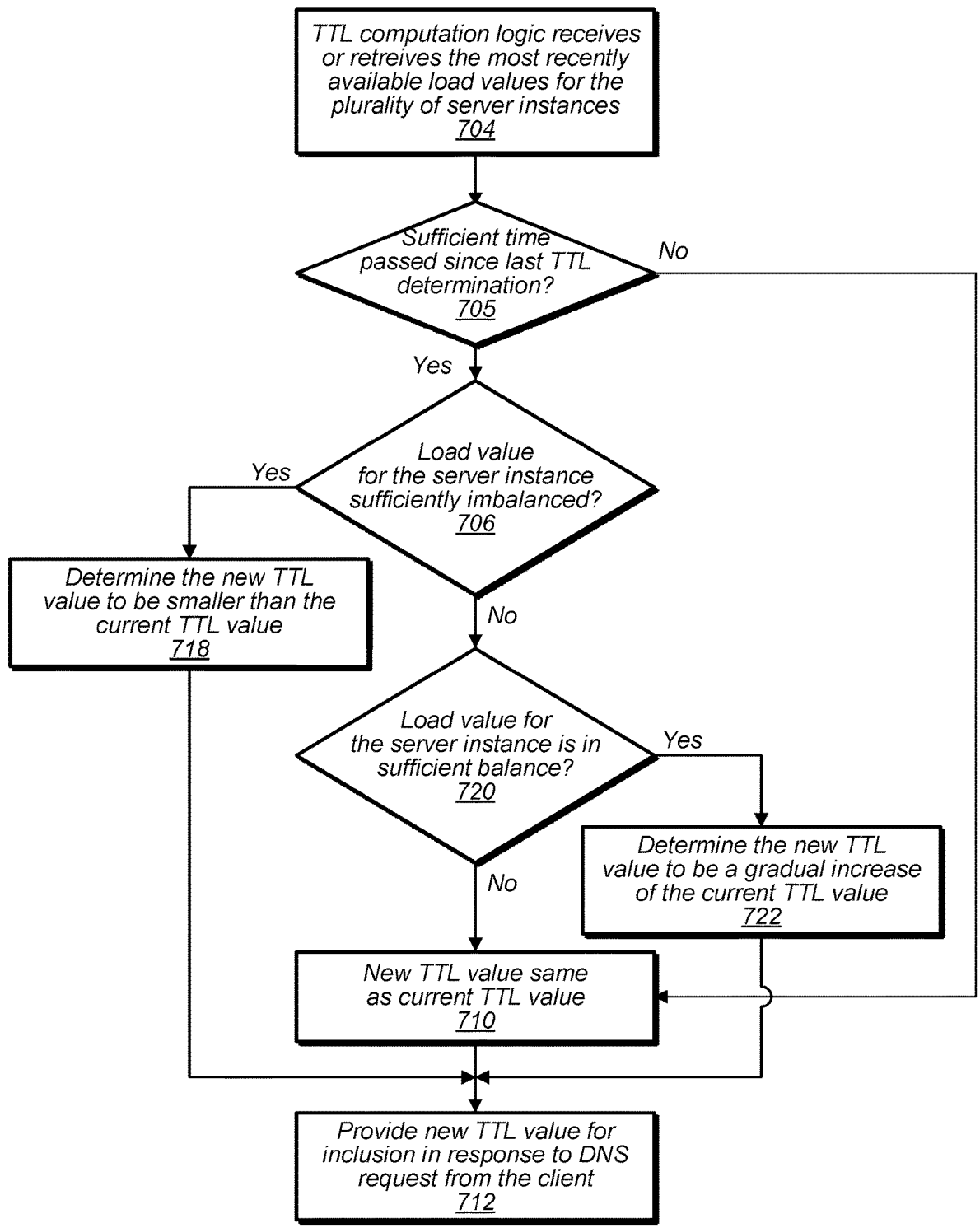
FIG. 7 is a flowchart of a DNS-based load balancing method that provides dynamic DNS record TTLs, according to at least some embodiments.

FIG. 7 is a flowchart of a DNS-based load balancing method that provides dynamic DNS record TTLs, according to at least some embodiments. The method begins in block 704 in which the TTL computation logic of a DNS server receives or retrieves the most recently available load values for the plurality of server instances. The method then transitions to block 705 in which it determines if sufficient time has passed since the last TTL determination. As explained previously, in some embodiments, after modifying the TTL value, the DNS layer waits for some period for the default TTL value to expire, and for new "A records" with the different TTL value to be handed back to requesting clients. If sufficient time has not passed, then the method simply transitions to block 710 in which the new TTL value is set to be the same as the current TTL value, and then to block 712 where the new TTL value is provided for inclusion in a response to the DNS request from the client, where a response to the DNS request from the client can include a response to a DNS request from a resolver.

If sufficient time has passed, then the method transitions to block 706, where it determines whether the load value for the server instance is sufficiently imbalanced in reference to other server instances in the plurality of server instances which are being load balanced. Another determination that might be made at this step, either to replace or in conjunction with the determination listed in block 706, is to determine whether the load or some other performance metric is above, or below, or between certain absolute or relative thresholds. If the load value of the server or server instance is sufficiently imbalanced, then the method transitions to block 718 which determines the new TTL value to be smaller than the current TTL value. The method can use any of the functionality described in this specification, or other functionality not described, in order to make this determination. Then the method transitions to block 712 where the new TTL value is provided for inclusion in a response to the DNS request from the client, where a response to the DNS request from the client can include a response to a DNS request from a resolver.

If the load value of the server instance is not sufficiently imbalanced, then the method transitions to block 720 in which it determines whether the server instance is in sufficient balance. If the load value is sufficiently balanced, then the method transitions to block 722 which determines the new TTL value to be a gradual increase of the current TTL value. The method then transitions to block 712 where the new TTL value is provided for inclusion in a response to the DNS request from the client, which includes a response to the DNS request from a resolver. If the load value is not sufficiently imbalanced, and not sufficiently balanced, then it is somewhere in between. When the load is in this "middle ground" then the method simply keeps the current TTL value in the DNS responses. The method therefore transitions to block 710 in which the new TTL value is set to be the same as the current TTL value, and then to block 712 where the new TTL value is provided for inclusion in a response to the DNS request from the client, which includes a response to the DNS request from a resolver.

Illustrative System

Figure 8:
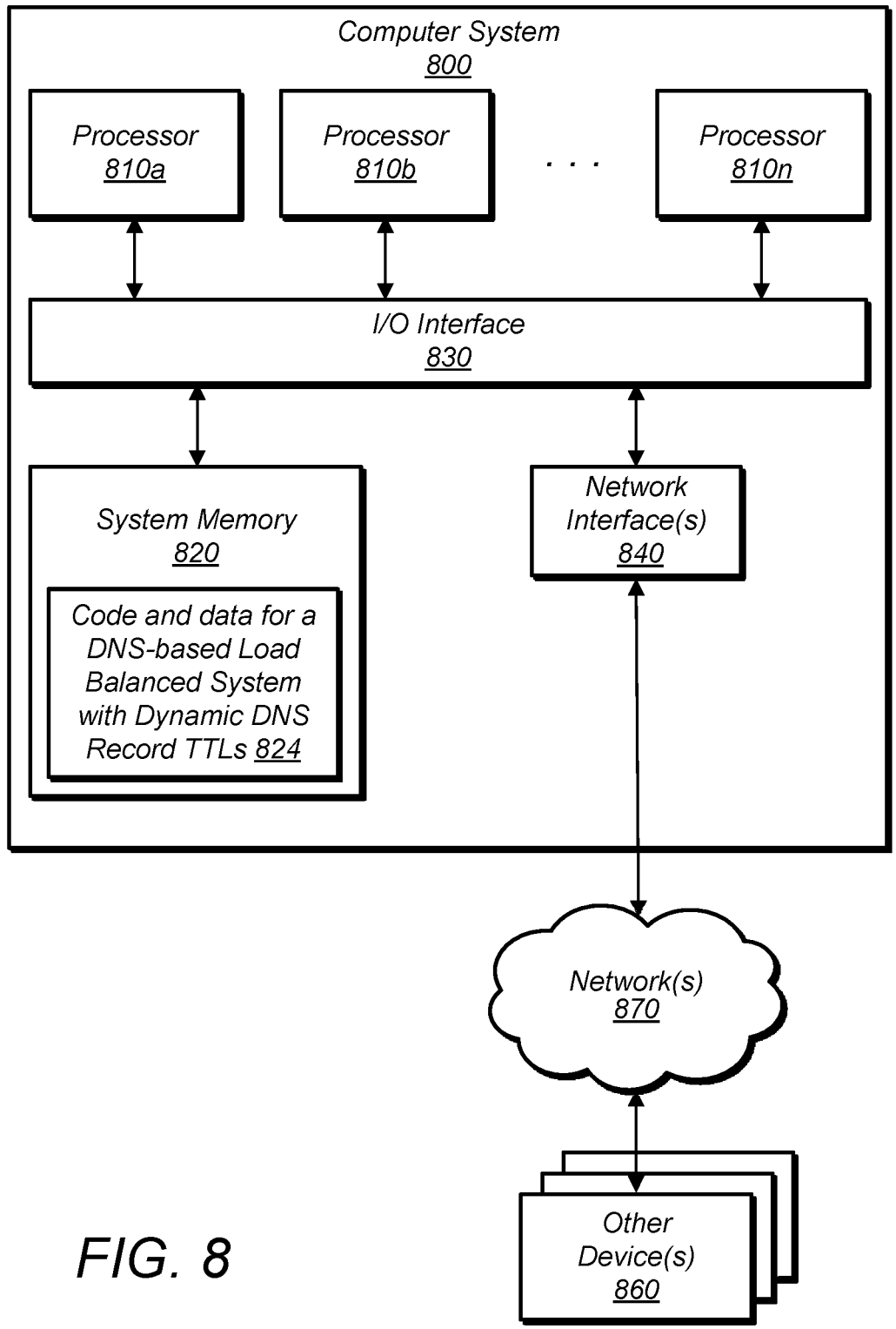
FIG. 8 is a block diagram illustrating an example computer system that may be used in some embodiments.

In at least some embodiments, a server that implements a portion or all of the methods and apparatus for load balancing traffic via dynamic DNS record TTLs as described herein may include a general-purpose computer system or computing device that includes or is configured to access one or more computer-accessible media, such as computer system 800 illustrated in FIG. 8. FIG. 8 is a block diagram illustrating an example computer system that may be used in some embodiments. This computer system can be used as a DNS Server 100, for example, or as a server host which executes one or more server instances (such as 120A . . . 120N) in the compute service 390a. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for DNS-based load balancing, are shown stored within system memory 820 as the code and data for a DNS-based load balanced system with dynamic DNS record TTLs 824.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 870, such as other computer systems or devices as illustrated in FIGS. 1 through 3B, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1 through 7 for implementing DNS-based load balancing via dynamic DNS-record TTLs. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A system, comprising:
a plurality of computers configured to implement a plurality of server instances for a network-based service; and
one or more computers configured as one or more domain name system (DNS) servers, wherein the one or more DNS servers are configured to:
receive performance metrics regarding the plurality of server instances;
receive a DNS request from a client for at least one network address, corresponding to the network-based service, wherein the DNS request references at least one domain name that is associated with the at least one requested network address;
determine, based at least on a load balancing scheme, a network address of a server instance of the plurality of server instances to include in a response to the DNS request, wherein the plurality of server instances are associated with the at least one referenced domain name;
determine, based at least on the received performance metrics of the server instance associated with the determined network address, a time-to-live (TTL) value to include in the response to the DNS request; and
send the response to the DNS request to the client, wherein the response comprises the determined network address and the determined TTL value;
wherein the TTL value specifies a time that the determined network address should be used by the client for accessing the network-based service.

2. The system as recited in claim 1, wherein the one or more DNS servers are further configured to:
receive a second DNS request from the or another client for at least one network address, corresponding to the network-based service, that is associated with the at least one domain name included in the second DNS request;
determine, based at least on the load balancing scheme, the network address of the server instance of the plurality of server instances to include in a response to the second DNS request, wherein the network address of the server instance is the same network address of the same server instance as determined for the first request;
determine that one or more performance metrics of the server instance associated with the determined network address exceed a threshold;
determine, based at least on the one or more performance metrics of the server instance, a second TTL value to include in the response to the second DNS request, wherein the second TTL value is smaller than the first TTL value; and
send the response to the second DNS request to the client, wherein the response to the second DNS request includes the determined network address, and the determined second TTL value.

3. The system as recited in claim 2, wherein the one or more DNS servers are further configured to:
receive a third DNS request from the or another client for at least one network address, corresponding to the network-based service, that is associated with the at least one domain name included in the third DNS request;
determine, based at least on the load balancing scheme, the network address of the server instance of the plurality of server instances to include in a response to the third DNS request, wherein the network address of the server instance is the same network address of the same server instance as determined for the first request;
determine that one or more performance metrics of the server instance associated with the determined network address is below the or another threshold;
determine, based at least on the one or more performance metrics of the server instance, a third TTL value to include in the response to the third DNS request, wherein the third TTL value is larger than the second TTL value, and wherein the difference between the first TTL value and the second TTL value is greater than the difference between the second TTL value and the third TTL value; and send the response to the third DNS request to the client, wherein the response to the third DNS request includes the determined network address, and the determined third TTL value.

4. The system as recited in claim 1, wherein the plurality of server instances comprise load balancers for load balancing other server instances separate from the plurality of server instances.

5. The system as recited in claim 1, wherein to determine the network address of the server instance to include in the response to the DNS request comprises to determine the network address based at least on received performance metrics of two or more of the plurality of server instances, wherein one or more server instances of the plurality of server instances whose performance metrics indicate heavier loads as compared to performance metrics of one or more other server instances of the plurality of server instances are determined less frequently than the one or more other server instances.

6. A method, comprising:
receiving a domain name system (DNS) request for at least one network address, corresponding to a network-based service, from a client, wherein the DNS request references at least one domain name that is associated with the at least one network address;
determining, based at least on a load balancing scheme, a network address of a server instance of a plurality of server instances to include in a response to the DNS request;
determining, based at least on received performance metrics of the server instance associated with the determined network address, a time-to-live (TTL) value to include in the response to the DNS request; and
sending the response to the DNS request to the client, wherein the response comprises the determined network address and the determined TTL value;
wherein the TTL value specifies a time that the determined network address should be used by the client for accessing the network-based service.

7. The method as recited in claim 6, wherein the method further comprises:
receiving a second DNS request from the or another client for at least one network address, corresponding to the network-based service, that is associated with the at least one domain name referenced in the second DNS request;
determining, based at least on the load balancing scheme, the network address of the server instance of the plurality of server instances to include in a response to the second DNS request, wherein the network address of the server instance is the same network address of the same server instance as determined for the first request;
determining that one or more performance metrics of the server instance associated with the determined network address exceed a threshold;
determining, based at least on the one or more performance metrics of the server instance, a second TTL value to include in the response to the DNS request, wherein the second TTL value is smaller than the first TTL value; and
sending the response to the second DNS request to the client, wherein the response to the second DNS request includes the determined network address, and the determined second TTL value.

8. The method as recited in claim 7, wherein the method further comprises:

receiving a third DNS request from the or another client for at least one network address, corresponding to the network-based service, that is associated with the at least one domain name referenced in the third DNS request;
determining, based at least on the load balancing scheme, the network address of the server instance of the plurality of server instances to include in a response to the third DNS request, wherein the network address of the server instance is the same network address of the same server instance as determined for the first request;
determining that one or more performance metrics of the server instance associated with the determined network address is below the or another threshold;
determining, based at least on the one or more performance metrics of the server instance, a third TTL value to include in the response to the third DNS request, wherein the third TTL value is larger than the second TTL value, and wherein the difference between the first TTL value and the second TTL value is greater than the difference between the second TTL value and the third TTL value; and
sending the response to the third DNS request to the client, wherein the response to the third DNS request includes the same determined network address, and the determined third TTL value.

9. The method as recited in claim 7, wherein the determining the second TTL value comprises setting the second TTL value to half of the first TTL value when the one or more performance metrics of the server instance exceed the threshold.

10. The method as recited in claim 7, wherein the determining the second TTL value comprises determining the second TTL value as being proportional to one or more of the one or more performance metrics of the server instance.

11. The method as recited in claim 6, wherein the determining, based at least on the load balancing scheme, the network address of the server instance comprises determining the network address using a round-robin load balancing scheme.

12. The method as recited in claim 6, wherein determining the network address of the server instance to include in the response to the DNS request comprises determining the network address based at least on received performance metrics of two or more of the plurality of server instances, wherein one or more server instances of the plurality of server instances whose performance metrics indicate heavier loads as compared to performance metrics of one or more other server instances of the plurality of server instances are determined less frequently than the one or more other server instances.

13. The method as recited in claim 6, wherein determining the time-to-live (TTL) value to include in the response to the DNS request comprises determining the TTL value based at least on whether one or more received performance metrics of the server instance associated with the determined network address are imbalanced as compared to one or more received performance metrics of one or more other server instances of the plurality of server instances.

14. A non-transitory computer-readable storage medium storing program instructions that when executed by one or more processors cause the one or more processors to:
receive a domain name system (DNS) request for at least one network address, corresponding to a network-based service, from a client, wherein the DNS request references at least one domain name that is associated with the at least one network address;

determine, based at least on a load balancing scheme, a network address of a server instance of a plurality of server instances to include in a response to the DNS request;

determine, based at least on received performance metrics of the server instance associated with the determined network address, a time-to-live (TTL) value to include in the response to the DNS request; and send the response to the DNS request to the client, wherein the response comprises the determined network address and the determined TTL value;

wherein the TTL value specifies a time that the determined network address should be used by the client for accessing the network-based service.

15. The non-transitory computer-readable storage medium of claim 14, storing program instructions that when executed by one or more processors further cause the one or more processors to:

receive a second DNS request from the or another client for at least one network address, corresponding to the network-based service, that is associated with the at least one domain name referenced in the second DNS request;

determine, based at least on the load balancing scheme, the network address of the server instance of the plurality of server instances to include in a response to the second DNS request, wherein the network address of the server instance is the same network address of the same server instance as determined for the first request;

determine that one or more performance metrics of the server instance associated with the determined network address exceed a threshold;

determine, based at least on the one or more performance metrics of the server instance, a second TTL value to include in the response to the second DNS request, wherein the second TTL value is smaller than the first TTL value; and send the response to the second DNS request to the client, wherein the response to the second DNS request includes the determined network address, and the determined second TTL value.

16. The non-transitory computer-readable storage medium of claim 15, storing program instructions that when executed by one or more processors further cause the one or more processors to: wherein to determine the second TTL value comprises to set the second TTL value to half of the first TTL value when the one or more performance metrics of the server instance exceed the threshold.

17. The non-transitory computer-readable storage medium of claim 15, storing program instructions that when executed by one or more processors further cause the one or more processors to: determine the second TTL value to be proportional to one or more of the one or more performance metrics of the server instance.

18. The non-transitory computer-readable storage medium of claim 15, storing program instructions that when executed by one or more processors further cause the one or more processors to:

receive a third DNS request from the or another client for at least one network address, corresponding to the network-based service, that is associated with the at least one domain name referenced in the third DNS request;

determine, based at least on the load balancing scheme, the network address of the server instance of the plurality of server instances to include in a response to the third DNS request, wherein the network address of the server instance is the same network address of the same server instance as determined for the first request;

determine that one or more performance metrics of the server instance associated with the determined network address is below the or another threshold;

determine, based at least on the one or more performance metrics of the server instance, a third TTL value to include in the response to the third DNS request, wherein the third TTL value is larger than the second TTL value, and wherein the difference between the first TTL value and the second TTL value is greater than the difference between the second TTL value and the third TTL value; and send the response to the third DNS request to the client, wherein the response to the third DNS request includes the same determined network address, and the determined third TTL value.

19. The non-transitory computer-readable storage medium of claim 14, storing program instructions that when executed by one or more processors further cause the one or more processors to: determine the network address of the server instance using a round-robin load balancing scheme.

20. The non-transitory computer-readable storage medium of claim 14, storing program instructions that when executed by one or more processors further cause the one or more processors to: determine the network address of the server instance based at least on received performance metrics of two or more of the plurality of server instances, wherein one or more server instances of the plurality of server instances whose performance metrics indicate heavier loads as compared to performance metrics of one or more other server instances of the plurality of server instances are determined less frequently than the one or more other server instances.

* * * * *